Nov. 16, 1943.  C. B. GREENBERG  2,334,622
EXPANSION LINK
Filed May 1, 1941
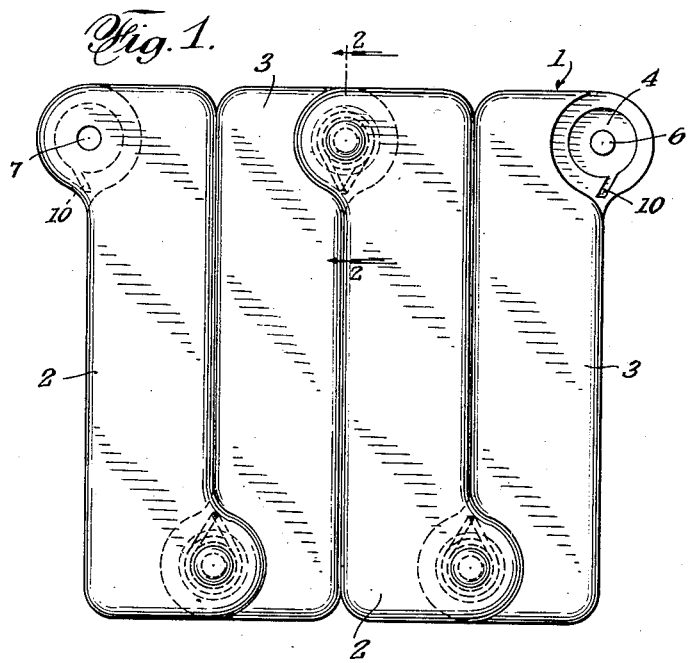
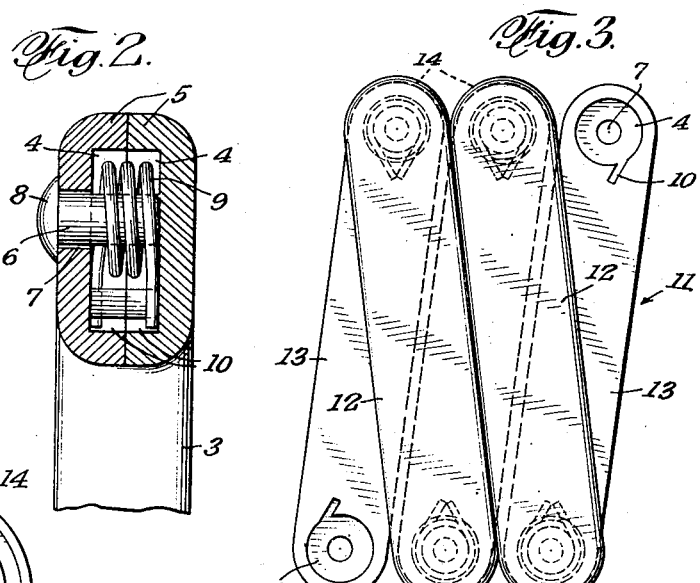
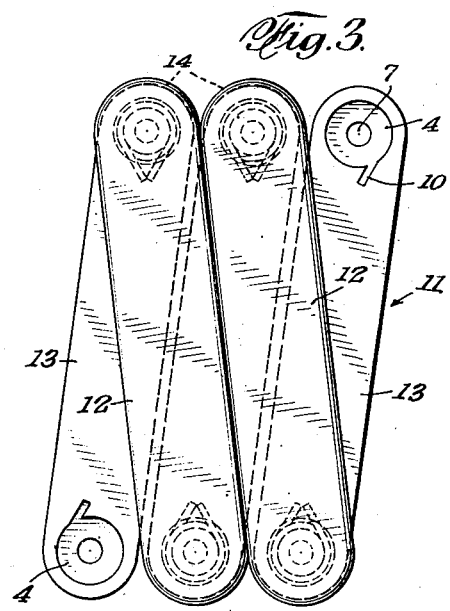
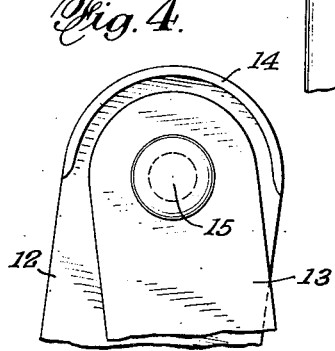
INVENTOR
CHARLES B. GREENBERG
BY William Wolfe
ATTORNEY Patented Nov. 16, 1943

2,334,622

UNITED STATES PATENT OFFICE 2,334,622

EXPANSION LINK

Charles B. Greenberg, New York, N. Y.

Application May 1, 1941, Serial No. 391,281

5 Claims. (Cl. 59—79)

My invention relates to expansion link chains for bracelets and bands for wrist watch straps, and in more detail, to a construction of a type of linkage in which the links are joined only at their ends.

An object of my invention is to form a simply constructed linkage capable of great expansion and flexible in a direction at an angle to the plane of the links. Another object is to construct a linkage in which the individual links can be easily and speedily shaped and formed on screw machines with a minimum of operations, quickly and easily assembled and result in an attractive and useful article of jewelry.

I accomplish these and other objects by positioning links side by side and by providing the ends of each link with oppositely shouldered parts and joining the adjacent opposite shouldered parts with a simple and loosely held pin joint and providing a spring tension to hold the links normally in a close relationship to one another. Another means of accomplishing the same objects is shown in my variation pictured in Figure 3 of the drawing in which the linkage is comprised of an upper or exposed and an under or hidden set of links, the ends of each of the under links being loosely pin joined to opposite ends of the upper links and the joined links being spring held normally in a contracted position.

Further and more specific details and objects of my invention will be shown and described in the accompanying drawing in which: Figure 1 is a plan view of the linkage, Figure 2 is a fragmentary side view partly in section along the line 2—2 of Fig. 1, and Figure 3 is a plan view of a variation of my invention with the under links outlined in dashed line, and Fig. 4 is an under view of the variation shown in Fig. 3.

In the drawing the chain 1 shown in Fig. 1 is comprised of links 2 and 3 which are similarly but oppositely shaped and positioned and together form the units of which the linkage is constructed. It will be noted that the pivot projections on the links are reversed and that if alternate links are turned around they are not the same as their adjacent links but that the projections are at the diagonally opposite corners of the links. Therefore the links may be called right and left hand link members or arms. The link 2 is provided at its upper left and lower right hand sections with the shouldered elements 5 and the swept out spring seats 4. In a like manner the link 3 is provided at its upper right and lower left hand sections with corresponding shouldered elements and spring seats.

In order that adjacent links can be joined together an extension or pin 6 and an opening or hole 7 is provided in the corresponding centers of swept out spring seats of adjacent links. As the hole 7 is larger than the pin 6 and the enlarged pin head 8 holds the links together in loose contact, freedom of movement of the links is retained and they can rotate laterally and transversely in relation to each other.

To aid in setting and holding the coiled springs 9 in position, the cut out spring seat ends 10 are provided, adjacent the swept out spring seats. The springs normally retain the links in close relationship and contract the linkage when expanded.

Although in the drawing the shoulder portions are each shown as being half of the thickness of the links and the spring seats as half formed in each link, this construction can be varied and the shoulders made of different thicknesses and the spring seats completely formed in either of the links, if desired.

A variation of my invention is shown in Figs. 3 and 4. This linkage 11 is formed of a series of upper links 12 and lower, or under links 13. The upper links are longer and broader than the lower ones and they are provided with the downward extending sections 14 at their ends partially to surround and encase the lower link ends. This structure partially prevents the showing of base metal if the lower links should be made of more inexpensive material, and also acts as a stop to limit the expansion of the linkage. Corresponding upper and lower link ends are loosely pin joined and held as at 15 and springs and spring seats similar to those as shown in Figs. 1 and 2 are provided to create the tension to hold the links in contracted loose relationship. The loosely held pin joints permit both lateral and transverse movement of the links in relationship to each other.

As the details described in the drawing show only two forms of my invention and since many changes and modifications may be made in the same invention without changing or departing from the spirit and scope of the basic idea, I desire to cover all modifications, forms and embodiments coming within the language of any one or more of the appended claims.

I claim:

1. A linkage comprised of upper and under link arms, pin means loosely holding corresponding arm ends and spring means to normally retain the arms in and return them to a close adjacent relationship, the upper link arms longer and broader than the under link arms and provided with downward extending covering elements at the arm ends enclosing the under link and limiting the expansion of the linkage.

2. A linkage comprised of upper and under link arms, pin means loosely holding corresponding arm ends, spring means to normally retain the arms in and return them to a close adjacent relationship and downward extending elements on the upper arms encasing the lower arm ends and limiting the expansion of the linkage.

3. A linkage comprised of link arms having inward extending recessed end portions, the arms so positioned that recessed portions of adjacent arms face each other, a pin positioned in the recess pivoting said arms together, a coiled spring surrounding said pin and tensioned against each arm for normally retaining and returning the arms with their sides in substantial contact with each other.

4. A linkage comprised of link arms, each arm having a sidewise extending portion provided with an inwardly extending recessed section, the arms so positioned that the recessed sections of adjacent arms face each other, a pin positioned in the recess and pivoting the arms together and a coiled spring extending about the pin and tensioned against the arms for normally retaining and returning the arms to a position with their sides in substantial contact.

5. An expandable linkage comprised of link arms, each arm having a sidewise extending portion provided with an inwardly extending recessed section, the arms so positioned that the recessed sections of adjacent arms face each other, a pin positioned in the recess and pivoting the arms together and a coiled spring extending about the pin and tensioned against the arms for normally retaining and returning the arms to a contracted position.

CHARLES B. GREENBERG.